(12) United States Patent
Yun et al.

(10) Patent No.: US 9,309,361 B2
(45) Date of Patent: Apr. 12, 2016

(54) AUTOMOBILE INTERIOR SHEET USING BIORESIN AND PREPARATION METHOD FOR THE SAME

(71) Applicant: LG HAUSYS, LTD., Seoul (KR)

(72) Inventors: Su Hyeong Yun, Busan (KR); Kyo Hoon Shin, Ulsan (KR); Dae Jong Baek, Busan (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/399,615

(22) PCT Filed: Sep. 21, 2012

(86) PCT No.: PCT/KR2012/007590
§ 371 (c)(1),
(2) Date: Nov. 7, 2014

(87) PCT Pub. No.: WO2014/046317
PCT Pub. Date: Mar. 27, 2014

(65) Prior Publication Data
US 2015/0105502 A1   Apr. 16, 2015

(51) Int. Cl.
| | | |
|---|---|---|
| *D06M 15/11* | (2006.01) |
| *C08J 5/18* | (2006.01) |
| *C08L 3/02* | (2006.01) |
| *C08L 23/02* | (2006.01) |
| *C08L 75/04* | (2006.01) |
| *B29C 51/00* | (2006.01) |
| *C08L 23/16* | (2006.01) |
| *C08L 69/00* | (2006.01) |
| *B29C 35/08* | (2006.01) |
| *B29C 47/00* | (2006.01) |
| *B29K 75/00* | (2006.01) |
| *C08K 5/00* | (2006.01) |
| *B29C 43/24* | (2006.01) |
| *C08K 5/04* | (2006.01) |
| *B29D 99/00* | (2010.01) |
| *B29K 33/04* | (2006.01) |
| *B29K 101/12* | (2006.01) |
| *B29C 51/02* | (2006.01) |
| *B29K 101/10* | (2006.01) |

(52) U.S. Cl.
CPC ............... *C08J 5/18* (2013.01); *B29C 35/0866* (2013.01); *B29C 47/0061* (2013.01); *B29C 51/002* (2013.01); *C08L 3/02* (2013.01); *C08L 23/02* (2013.01); *C08L 23/16* (2013.01); *C08L 69/00* (2013.01); *C08L 75/04* (2013.01); *B29C 43/24* (2013.01); *B29C 47/0004* (2013.01); *B29C 47/0021* (2013.01); *B29C 51/02* (2013.01); *B29C 2035/0877* (2013.01); *B29D 99/001* (2013.01); *B29K 2003/00* (2013.01); *B29K 2033/04* (2013.01); *B29K 2075/00* (2013.01); *B29K 2101/10* (2013.01); *B29K 2101/12* (2013.01); *B29K 2995/0056* (2013.01); *C08J 2303/00* (2013.01); *C08J 2303/02* (2013.01); *C08J 2323/02* (2013.01); *C08J 2375/04* (2013.01); *C08K 5/0016* (2013.01); *C08K 5/0025* (2013.01); *C08K 5/04* (2013.01); *C08L 2205/08* (2013.01); *C08L 2312/00* (2013.01)

(58) Field of Classification Search
CPC ...... C08J 5/18; C08J 2303/00; C08J 2323/02; B29C 47/0061; B29D 99/001
USPC .......................................................... 524/53
See application file for complete search history.

(56) References Cited

U.S. PATENT DOCUMENTS

| | | | | |
|---|---|---|---|---|
| 2010/0323182 A1* | 12/2010 | Hashiba | ................... | B32B 5/18 428/297.4 |
| 2011/0305886 A1 | 12/2011 | Phan et al. | | |

FOREIGN PATENT DOCUMENTS

| | | |
|---|---|---|
| JP | 06-192375 | 7/1994 |
| JP | 2004-002613 | 1/2004 |
| JP | 2009-215565 A | 9/2009 |
| JP | 2012-158707 A | 8/2012 |
| KR | 10-1998-0072370 | 11/1998 |
| KR | 10-0505922 | 8/2005 |
| KR | 10-2007-0119632 | 12/2007 |
| KR | 10-0833583 | 5/2008 |
| KR | 10-2009-0077010 | 7/2009 |
| KR | 10-0941269 | 2/2010 |
| KR | 10-2010-0108683 | 10/2010 |
| KR | 20100108683 A * | 10/2010 |
| KR | 10-2011-0109059 | 10/2011 |
| KR | 20110109059 A * | 10/2011 |
| KR | 10-2012-0093004 | 8/2012 |
| KR | 10-2013-0008993 | 1/2013 |
| WO | 2009/001625 A1 | 12/2008 |
| WO | 2009/041054 A | 4/2009 |
| WO | 2011117549 A1 | 9/2011 |

OTHER PUBLICATIONS

Translation of KR1020110109059, Oct. 6, 2011.*

* cited by examiner

*Primary Examiner* — Hui Chin
(74) *Attorney, Agent, or Firm* — Dentons US LLP

(57) ABSTRACT

The present invention provides an automobile interior sheet using a bioresin that includes: 5 to 100 parts by weight of a bioresin prepared from a starch extracted from at least one natural plant selected from the group consisting of corn, potato, sweet potato, sugar cane, bamboo, or similarities thereof; 30 to 100 parts by weight of a thermoplastic polyolefin (TPO) resin or a thermoplastic polyurethane (TPU) resin; 5 to 40 parts by weight of a compatibilizer; 0.1 to 1.5 part by weight of a lubricant; and 0.5 to 5 parts by weight of a crosslinking agent.

10 Claims, 1 Drawing Sheet

Mixing step → Pelletizing step → Sheet forming step → Curing step

AUTOMOBILE INTERIOR SHEET USING BIORESIN AND PREPARATION METHOD FOR THE SAME

This application is a National Stage Entry of International Application No. PCT/KR2012/007590, filed Sep. 21, 2012, which are hereby incorporated by reference in its entirety for all purposes as if fully set forth herein.

BACKGROUND OF THE INVENTION

1. Field of the Invention

The present invention relates to an automobile interior sheet using a bioresin and a preparation method for the same and, more particularly, to an automobile interior sheet using a bioresin and a preparation method for the same, which automobile interior sheet achieves excellent performances not only to secure the product performance, embossing quality and sensorial quality such as hand feeling of the automobile surface materials required to have various mechanical characteristics but also to reduce emission of $CO_2$ and total volatile organic compounds (TVOC) and is thus suitable for the manufacture of surface materials for automobile instrument panel, lower panel, console box, seat cover, door, and so forth.

2. Background Art

Among the skins of the surface materials for automobile instrument panel, lower panel, console box, seat cover, door, etc., all the products other than seat covers are mostly prepared by the vacuum molding process using a sheet of polyvinyl chloride (PVC) or thermoplastic polyolefin (TPO) sheet or the powder slush molding process using PVC or thermoplastic polyurethane (TPU).

Further, the sear covers are generally prepared by processing PVC, polyurethane (PU) artificial leather or texture, real leather, or the like.

In contrast to the conventional skins of surface materials, the bio-sheet is formed from a plant-derived resin, causing no deterioration in the required properties or workability but providing eco-friendliness. Thus, the bio-sheet contributes to the manufacture of interior materials harmless to the human body.

The bio-sheet is known to be very resistant to softening due to its characteristics. As the bio-sheet is susceptible to degradation when in contact with sunlight or water, it is widely used for disposal products or industrial plastic products such as floor mats or trunks that are required to have endurance and mostly used in a place out of the sun.

Accordingly, there has been a pressing need for an automobile interior sheet as an automobile interior surface material using a material prepared by mixing a plant-derived bioresin and a TPU or TPO resin already guaranteed in performance as an interior material and then adding electron beam (EB) crosslinkage to increase its properties, thereby reducing emission of $CO_2$ and enhancing air quality without deterioration in the properties.

SUMMARY OF THE INVENTION

The present invention is contrived in consideration of the above-mentioned problems with the prior art. It is therefore an object of the present invention to provide an automobile interior sheet using a bioresin and a preparation method for the same, which automobile interior sheet using a bioresin is applicable to vacuum molding and excellent in sewing performance to offer remarkable performances not only in securing the product performance, embossing quality and sensorial quality such as hand feeling as an automobile surface material required to have various mechanical characteristics but also in reducing emission of $CO_2$ and total volatile organic compounds (TVOC).

To achieve the object of the present invention, there is provided an automobile interior sheet using a bioresin that includes: 5 to 100 parts by weight of a bioresin prepared from a starch extracted from at least one natural plant selected from the group consisting of corn, potato, sweet potato, sugar cane, bamboo, or similarities thereof; 30 to 100 parts by weight of a thermoplastic polyolefin (TPO) resin or a thermoplastic polyurethane (TPU) resin; 5 to 40 parts by weight of a compatibilizer; 0.1 to 1.5 part by weight of a lubricant; and 0.5 to 5 parts by weight of a crosslinking agent.

The bioresin uses at least one selected from the group consisting of polylactic acid (PLA), polybutylene succinate (PBS), bio-polyethylene, a plant-derived resin, and poly-hydroxy alkanoate (PHA), where the plant-derived resin is extracted from at least one natural plant selected from the group consisting of corn, potato, sweet potato, sugar cane, bamboo, or similarities thereof.

The thermoplastic polyolefin (TPO) resin includes any one selected from the group consisting of ethylene octane rubber (FOR), polypropylene (PP)-based thermoplastic vulcanizate (TPV), and P-based thermoplastic vulcanizate (TPV).

The thermoplastic polyurethane (TPU) resin includes any one selected from the group consisting of polycarbonate (PC)-based polyol, ether-based polyol, and ester-based polyol.

The compatibilizer includes any one selected from the group consisting of glycidylmethacrylate (GMA), maleic anhydride (MAH), maleic acid (MA), and EMMA.

The crosslinking agent includes any one selected from the group consisting of triallyl isocyanurate (TAIC), trimethylolpropane triacrylate (TMPTA), hexandiol diacrylate (HDDA), triallyl cynurate (TAC), and tripropylene glycol diacrylate (TPGDA).

In accordance with another embodiment of the present invention, there is provided a method for preparing an automobile interior sheet using a bioresin that includes: mixing a bioresin, a thermoplastic olefin resin or a thermoplastic urethane resin, a compatibilizer, a lubricant, and a crosslinking agent together (S10); processing the mixed material into pellets (S20); molding the pellets into a sheet using an extruder or a calender (S30); and curing the sheet type material (S40).

The step (S10) is performed using a pressure kneader, a Bnbary mixer, or an extruder.

The curing step (S40) is performed using an electron beam (EB) irradiation device.

In the curing step (S40), the radioactive energy absorbed by the electron beam (EB) irradiation device is in the range of 10 to 100 kGy.

The method for preparing an automobile interior sheet using a bioresin according to one embodiment of the present invention further includes: applying an acryl- or urethane-based resin onto the surface of the cured material by coating (S50); and embossing the coated surface of the material (S60).

According to the present invention as described above, it is possible to provide an automobile interior sheet using a bioresin and a preparation method for the same, where the automobile interior sheet is applicable to vacuum molding and excellent in sewing performance, without deterioration in the use properties as in the prior art, and offers remarkable performances to secure the product performance, embossing quality and sensorial quality such as hand feeling as an automobile surface material having various mechanical characteristics.

According to the present invention, it is also possible to provide an automobile interior sheet using a bioresin and a preparation method for the same, where the automobile interior sheet not only offers an excellent performance in reducing emission of $CO_2$ and total volatile organic compounds (TVOC) to enhance the air quality in the automobile vehicles but also gives no harmful influence on the skin in contact prevents occurrence of allergy, so it is applicable to eco-friendly green cars and thus genuinely contributes to the eco-friendly green car which has been emerging as a global issue.

According to the present invention, it is also possible to provide an automobile interior sheet using a bioresin and a preparation method for the same, where the automobile interior sheet can be prepared by using an alternative process to the existing high-end PU-spray process to enhance different performances at low cost.

DETAILED DESCRIPTION OF THE PREFERRED EMBODIMENT

Figure 1:
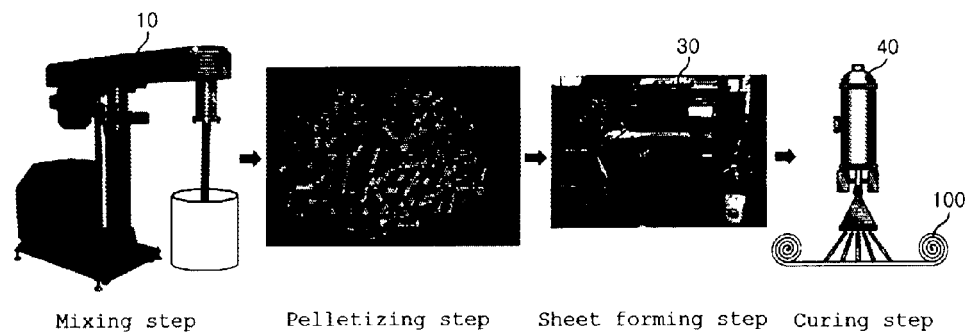
FIG. 1 is a diagram showing the process of preparing an automobile interior sheet using a bioresin according to one embodiment of the present invention.
Figure 2:
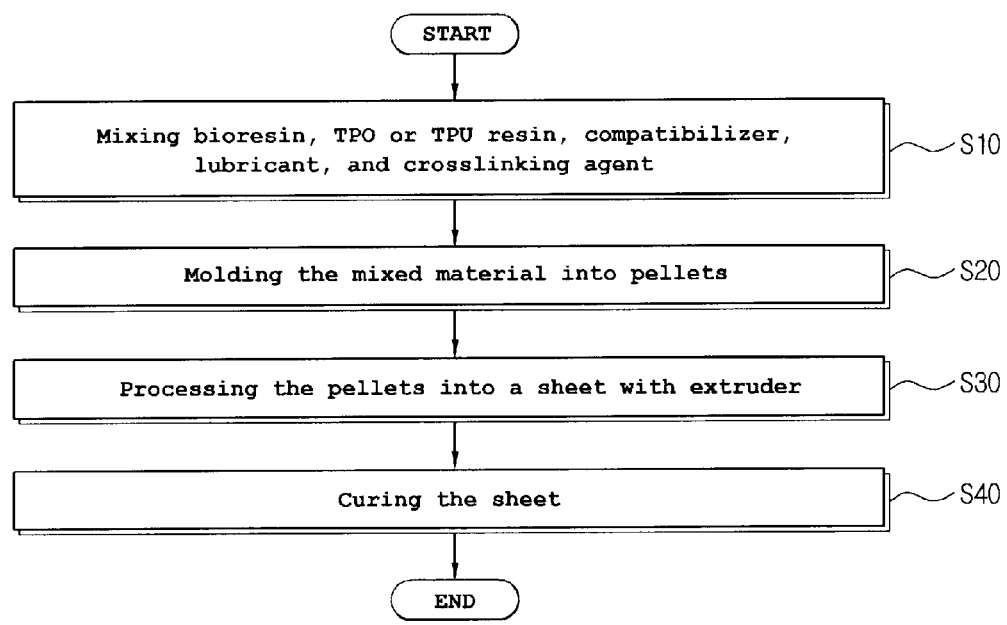
FIG. 2 is a flow chart showing the process of preparing an automobile interior sheet using a bioresin according to one embodiment of the present invention.

The specific contents of other embodiments are included in the detailed description and the accompanying drawings.

The advantages and features of the present invention and the methods to achieve them will be made apparent from the embodiments described in detail with reference to the accompanying drawings.

The present invention may, however, be embodied in many different forms and should not be construed as limited to the embodiments set forth herein. Rather, these embodiments are provided so that this disclosure will be thorough and complete, and fully convey the scope of the invention to those skilled in the art.

Throughout the specification, the same reference numbers may be used to denote similar components in the various embodiments.

Hereinafter, a detailed description will be given as to an automobile interior sheet using a bioresin and a preparation method for the same according to the embodiments of the present invention with reference to the accompanying drawings.

In accordance with one embodiment of the present invention, an automobile interior sheet 100 using a bioresin may include: 5 to 100 parts by weight of a bioresin prepared from a starch extracted from at least one natural plant selected from the group consisting of corn, potato, sweet potato, sugar cane, bamboo, or similarities thereof; 30 to 100 parts by weight of a thermoplastic polyolefin (TPO) resin or a thermoplastic polyurethane (TPU) resin; 5 to 40 parts by weight of a compatibilizer; 0.1 to 1.5 part by weight of a lubricant; and 0.5 to 5 parts by weight of a crosslinking agent.

In this regard, the bioresin may use at least one selected from the group consisting of polylactic acid (PLA), polybutylene succinate (PBS), bio-polyethylene, a plant-derived resin, and poly-hydroxy alkanoate (PHA), where the plant-derived resin is extracted from at least one natural plant selected from the group consisting of corn, potato, sweet potato, sugar cane, bamboo, or similarities thereof.

The thermoplastic polyolefin (TPO) resin may include any one of ethylene octane rubber (EOR), polypropylene (PP)-based thermoplastic vulcanizate (TPV), or P-based thermoplastic vulcanizate (TPV).

The thermoplastic polyurethane (TPU) resin may include any one of polycarbonate (PC)-based polyol, ether-based polyol, or ester-based polyol.

The compatibilizer may include any one of glycidyl-methacrylate (GMA), maleic anhydride (MAH), maleic acid (MA), or EMMA.

The crosslinking agent may include any one of triallyl isocyanurate (TAIL), trimethylolpropane triacrylate (TMPTA), hexandiol diacrylate (HDDA), triallyl cynurate (TAC), or tripropylene glycol diacrylate (TPGDA).

In accordance with another embodiment of the present invention, a method for preparing an automobile interior sheet using a bioresin may include: mixing a bioresin, a thermoplastic olefin resin or a thermoplastic urethane resin, a compatibilizer, a lubricant, and a crosslinking agent together (S10); processing the mixed material into pellets (S20); molding the pellets into a sheet using an extruder or a calender (S30); and curing the sheet type material (S40).

In this regard, the step (S10) may be performed using a pressure kneader, a Bnbary mixer, or an extruder. The curing step (S40) may be performed using an electron beam (EB) irradiation device. In the curing step (S40), the radioactive energy absorbed by the electron beam (EB) irradiation device may be in the range of 10 to 100 kGy.

As described above, in the curing step (S40) using an electron beam (EB) irradiation device 40, electron beams emitted from the electron beam (EB) irradiation device 40 are applied to the sheet type material. This converts each polymer strain constituting the material into a net-like molecular structure to improve mechanical properties such as tensile strength or the like.

The method for preparing the automobile interior sheet using a bioresin according to one embodiment of the present invention further includes: applying an acryl- or urethane-based resin onto the surface of the cured material by coating (S50); and embossing the coated surface of the material (S60).

In this regard, the coating step (S50) protects the material against surface scratches and UV light and improves the glossing effect. The embossing step (S60) forms a natural leather pattern or a geometrical pattern.

It would be understood by those skilled in the art that various forms may be made without changing technical conception and essential features of the present invention.

Thus, it is clear that the above-described embodiments are illustrative in all aspects and do not limit the present disclosure.

The scope of the present invention is defined by the following claims rather than by the detailed description of the embodiment. It shall be understood that all modifications and embodiments conceived from the meaning and scope of the claims and their equivalents are included in the scope of the present invention.

DESCRIPTION OF NUMERAL NUMBERS

10: Mixer
20: Pelletizer
40: EB irradiation device 100: Automobile interior sheet using bioresin

What is claimed is:

1. An automobile interior sheet using a bioresin, comprising:

5 to 100 parts by weight of a bioresin prepared from a starch extracted from at least one natural plant selected from the group consisting of corn, potato, sweet potato, sugar cane or bamboo;

30 to 100 parts by weight of a thermoplastic polyolefin (TPO) resin or a thermoplastic polyurethane (TPU) resin;

5 to 40 parts by weight of a compatibilizer, wherein the compatibilizer includes any one compound selected from the group consisting of glycidylmethacrylate (GMA), maleic anhydride (MAH), maleic acid (MA), and ethylene methacrylic methyl acid (EMMA);

0.1 to 1.5 part by weight of a lubricant; and 0.5 to 5 parts by weight of a crosslinking agent.

2. The automobile interior sheet using a bioresin as claimed in claim 1, wherein the bioresin uses at least one selected from the group consisting of polylactic acid (PLA), polybutylene succinate (PBS), bio-polyethylene, a plant-derived resin, and poly-hydroxy alkanoate (PHA), wherein the plant-derived resin is extracted from at least one natural plant selected from the group consisting of corn, potato, sweet potato, sugar cane or bamboo.

3. The automobile interior sheet using a bioresin as claimed in claim 1, wherein the thermoplastic polyolefin (TPO) resin includes any one selected from the group consisting of ethylene octane rubber (EOR), and polypropylene (PP)-based thermoplastic vulcanizate (TPV).

4. The automobile interior sheet using a bioresin as claimed in claim 1, wherein the thermoplastic polyurethane (TPU) resin includes any one selected from the group consisting of polycarbonate (PC)-based polyol, ether-based polyol, and ester-based polyol.

5. The automobile interior sheet using a bioresin as claimed in claim 1, wherein the crosslinking agent includes any one selected from the group consisting of triallyl isocyanurate (TAIL), trimethylolpropane triacrylate (TMPTA), hexandiol diacrylate (HDDA), triallyl cyanurate (TAC), and tripropylene glycol diacrylate (TPGDA).

6. A method for preparing an automobile interior sheet using a bioresin, comprising:

mixing a bioresin, a thermoplastic olefin resin or a thermoplastic urethane resin, a compatibilizer, a lubricant, and a crosslinking agent together wherein the compatibilizer includes any one compound selected from the group consisting of glycidylmethacrylate (GMA), maleic anhydride (MAH), maleic acid (MA), and ethylene methacrylic methyl acid (EMMA);

processing the mixed material into pellets;

molding the pellets into a sheet using an extruder or a calender; and curing the sheet material.

7. The method as claimed in claim 6, wherein the mixing step is performed using a pressure kneader, a Banbary mixer, or an extruder.

8. The method as claimed in claim 6, wherein the curing step is performed using an electron beam (EB) irradiation device.

9. The method as claimed in claim 8, wherein in the curing step, the radioactive energy absorbed by the electron beam (EB) irradiation device is in the range of 10 to 100 kGy.

10. The method as claimed in claim 6, further comprising:

applying an acryl- or urethane-based resin onto the surface of the cured material by coating; and embossing the coated surface of the material.

\* \* \* \* \*